US008986475B2

(12) United States Patent
Ense et al.

(10) Patent No.: US 8,986,475 B2
(45) Date of Patent: Mar. 24, 2015

(54) HEAT TRANSFER LABELING MACHINE WITH HOT AIR TREATMENT STATIONS

(75) Inventors: Bruce A. Ense, Cincinnati, OH (US); John T. Martin, Cincinnati, OH (US)

(73) Assignee: MCC-Norwood, LLC, Batavia, OH (US)

(*) Notice: Subject to any disclaimer, the term of this patent is extended or adjusted under 35 U.S.C. 154(b) by 493 days.

(21) Appl. No.: 13/161,608

(22) Filed: Jun. 16, 2011

(65) Prior Publication Data

US 2011/0308697 A1 Dec. 22, 2011

Related U.S. Application Data

(60) Provisional application No. 61/356,091, filed on Jun. 18, 2010.

(51) Int. Cl.
*B32B 41/00* (2006.01)
*B65C 9/25* (2006.01)

(52) U.S. Cl.
CPC ........................................ *B65C 9/25* (2013.01)
USPC ............. 156/64; 156/350; 156/351; 156/359; 156/367; 156/378; 156/379; 156/497; 156/499; 156/DIG. 24; 156/DIG. 36; 156/DIG. 38; 156/DIG. 43; 156/DIG. 44; 156/DIG. 45

(58) Field of Classification Search
CPC ........ B65C 9/1873; B65C 3/16; B44C 1/1712
USPC ........... 156/64, 350, 351, 359, 367, 378, 379, 156/497, 499, DIG. 24, DIG. 36, DIG. 38, 156/DIG. 43, DIG. 44, DIG. 45
See application file for complete search history.

(56) References Cited

U.S. PATENT DOCUMENTS

| | | | | |
|---|---|---|---|---|
| 5,709,770 | A | 1/1998 | Asghar et al. | |
| 6,098,689 | A * | 8/2000 | Fiwek | 156/540 |
| 6,401,785 | B1 * | 6/2002 | Van Geijlswijk | 156/497 |
| 6,537,651 | B2 | 3/2003 | Geurtsen et al. | |
| 6,780,005 | B2 | 8/2004 | Kessler | |
| 6,796,352 | B1 | 9/2004 | Geurtsen et al. | |
| 6,797,747 | B1 | 9/2004 | Patel et al. | |
| 6,887,333 | B1 * | 5/2005 | Kessler et al. | 156/230 |
| 6,998,006 | B1 | 2/2006 | Kessler et al. | |
| 7,014,895 | B1 | 3/2006 | Grotefend et al. | |
| 7,364,777 | B1 | 4/2008 | Ansari | |

* cited by examiner

*Primary Examiner* — Michael Orlando
*Assistant Examiner* — Joshel Rivera
(74) *Attorney, Agent, or Firm* — Wood, Herron & Evans, LLP

(57) ABSTRACT

A transfer label machine has a post treatment station for exposing newly applied labels to heat in order to finish and gloss out the label. The heat is applied through a nozzle coupled to a hot air supply system that includes a blower, ductwork, and a heating element disposed in the airflow. A temperature probe measures temperature of the air flow and an IR sensor measures the resulting temperature of containers on which the labels have been applied. A programmable logic controller (PLC) is programmed with proportional integral derivative (PID) algorithms to control the blower speed and the heating element to provide the appropriate amount of heat for the labeling or processing speed at which the labeling machine is operating. A vision system can confirm the quality of label after the post treatment heating. In the event of a machine jam, the blower and/or heating element can be turned off or the air can be shunted away from the containers to reduce greatly the likelihood of a fire, which has occurred with prior art flame based post treatment heating units.

9 Claims, 2 Drawing Sheets

HEAT TRANSFER LABELING MACHINE WITH HOT AIR TREATMENT STATIONS

REFERENCE TO RELATED APPLICATION

Priority is hereby claimed to the filing date of U.S. provisional patent application No. 61/356,091 entitled Heat Transfer Labeling Machine with Hot Air Treatment Stations, filed on 18 Jun. 2010.

TECHNICAL FIELD

This provisional disclosure relates generally to the application of heat transfer labels to items such as plastic bottles, and more specifically to pre-treatment of bottles prior to application of labels and post-treatment of labels after application to bottles.

BACKGROUND

Application of heat transfer labels to containers such as plastic bottles for consumer products is common. Generally speaking, heat transfer labels to be applied are arranged in serial fashion on a long strip or web of material such as paper. A release layer, which may be a wax, a lacquer, a combination of the two, or another substance, is disposed on the web for printing. During the labeling process, plastic bottles (or other articles) to be labeled traditionally have had their dyne level modified by being moved past an air/gas flame directed toward the path of the bottles. This causes the surface of the bottles to oxidize, which advantageously alters the surface tension characteristics of the bottle so that a label can be applied more effectively. Attempts to replace treatment heating with an alternative have not proven cost effective and so flame pre-treatment has persisted even though it uses an open flame.

The label web is heated by being passed over a pre-heat plate and/or a heated platen to begin to melt and thus soften the material of the release layer. Each bottle then passes an applicator station, wherein a label on the web is aligned with and progressively transferred from the web and onto the surface of the bottle. A transfer roller insures uniform contact between the label and the bottle. The label sticks to the surface of the bottle and some of the material of the release layer remains on the label.

Each labeled bottle is then traditionally moved past a post-treatment station, where it is again subjected to a post-treatment air/gas flame. The heat of the post-treatment flame melts the wax and/or lacquer or other material from the release layer, causing it to flow over the underlying label thereby forming a clear glossy protective layer on the label and fixing the label securely on the surface of the bottle. This is sometimes referred to as "glossing out" the label. The post-treatment flame also tends to "burn out" defects such as air bubbles beneath labels and defects in labels so that the defects can be detected more easily by a downstream quality control vision system.

More recently, plastic bottle and label chemistries have been developed that eliminate the requirement to pre-treat the bottles to create surface tension before applying heat transfer labels. This is a welcome development for bottle labelers because supplying pre-treatment heat in the form of an air/gas flame in a labeling machine introduces risks, complexity, and costs that are undesirable. For instance, the relatively open flame can present hazards to workers and, in the event of a machine jamb, can result in melted bottles or even fires. With the newly developed chemistries, however, the air/gas burners in the pre-treatment station are not needed and can be eliminated.

Even where the need for pre-treatment heating is eliminated, post-treatment heating to gloss out the applied labels and burn out defects is still highly desirable. However, since an undesirable air/gas flame is not required for pre-treatment, there exists a need to eliminate flames altogether by eliminating an air-gas flame in the post-treatment station as well, and replacing the flame with an alternative that is effective, safe, controllable, capable of being monitored, and otherwise equally as effective as an open flame in post-treatment. It is to the provision of such a replacement system and to a method of post-treating bottles after application of heat transfer labels that the present invention is primarily directed.

SUMMARY

U.S. provisional patent application Ser. No. 61/356,091, to which priority is claimed above, is hereby incorporated by reference in its entirety.

Briefly described, a heat transfer labeling machine includes a post-treatment station that comprises one or more hot air nozzles or knives directed toward the path of freshly labeled bottles (or other containers) passing the post-treatment station. The nozzles are coupled through appropriate ducts to a blower assembly that forces air through the ducts to be ejected through the nozzles toward the bottles as the bottles move downstream. An electric air heating unit is disposed at an appropriate location along the ducts to heat the air before it is ejected from the nozzles. The heating elements and blower are controllable by a PLC or computer controller so that the temperature and volume of hot air applied to passing bottles is monitored and matched to the labeling speed and the rate at which the bottles move through the post-treatment station. In this way, the label can be subjected to the proper amount of heat to raise it to its optimum glossing temperature regardless of the labeling speed of the machine. A consistent and reliable clear gloss finish over the labels is thus achieved. Further, the hot air also burns out bubbles and defects in applied labels so that they can be detected by a downstream vision system resulting in removal of the defectively labeled bottles from production. In addition, the risk of fire in the event, for instance, of a machine jamb is greatly reduced since the controller can be programmed to turn off the heat source and/or the blower and/or to shunt the flow of heated air through a dump valve if a machine jamb or other stoppage occurs. Finally, similar hot air nozzles can be situated at an upstream portion of the machine for pre-treating bottles in situations where pre-treatment is called for.

These and other aspects, features, and advantages of the labeling machine with heat treatment system disclosed herein will become more apparent upon review of the detailed description set forth below taken in conjunction with the accompany drawing figures, which are briefly described as follows.

DETAILED DESCRIPTION

Figure 1:
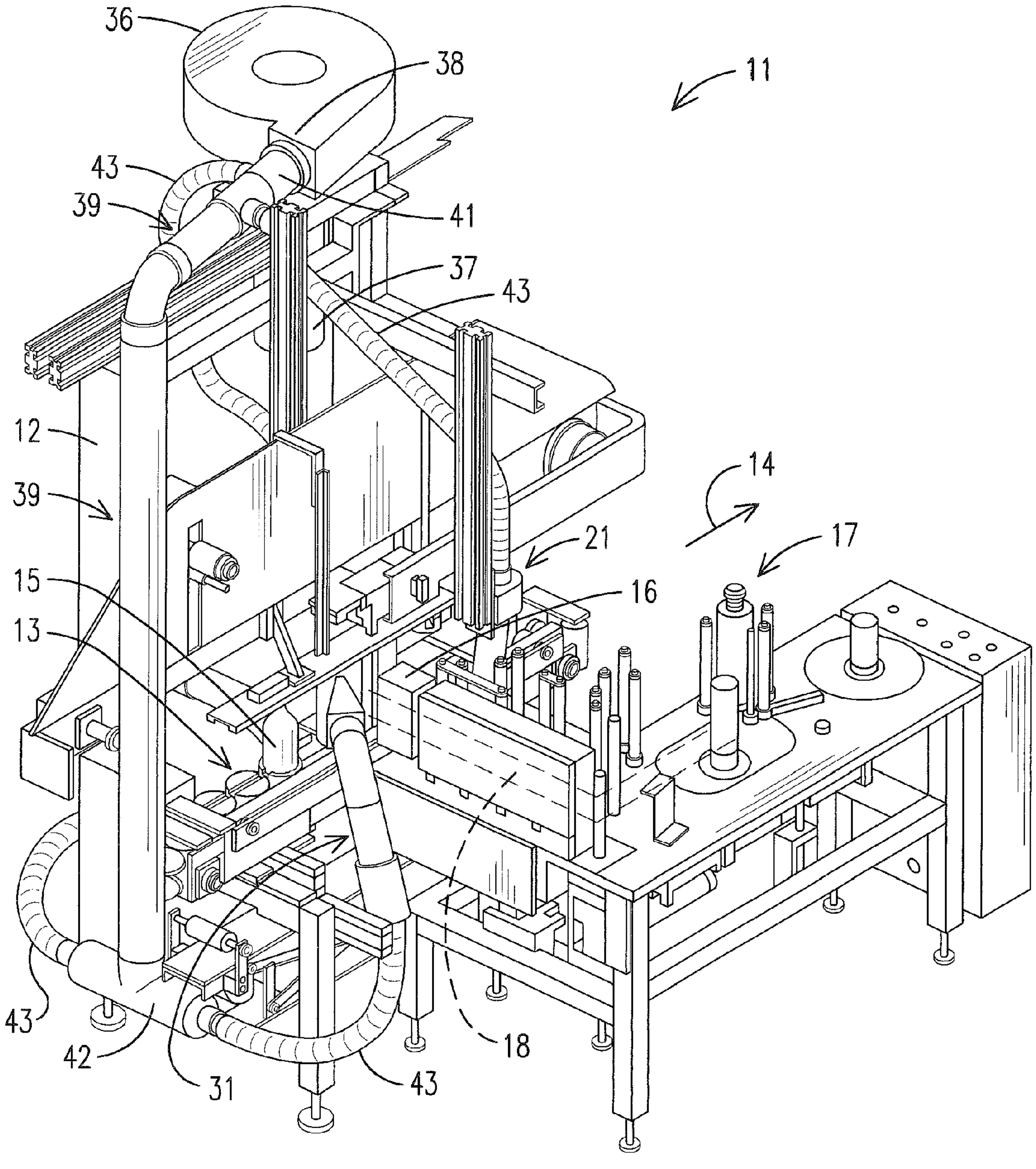
FIG. 1 is a perspective front quarter view of a heat transfer labeling machine including hot air post and pre-treatment assemblies according to principles of the invention.
Figure 2:
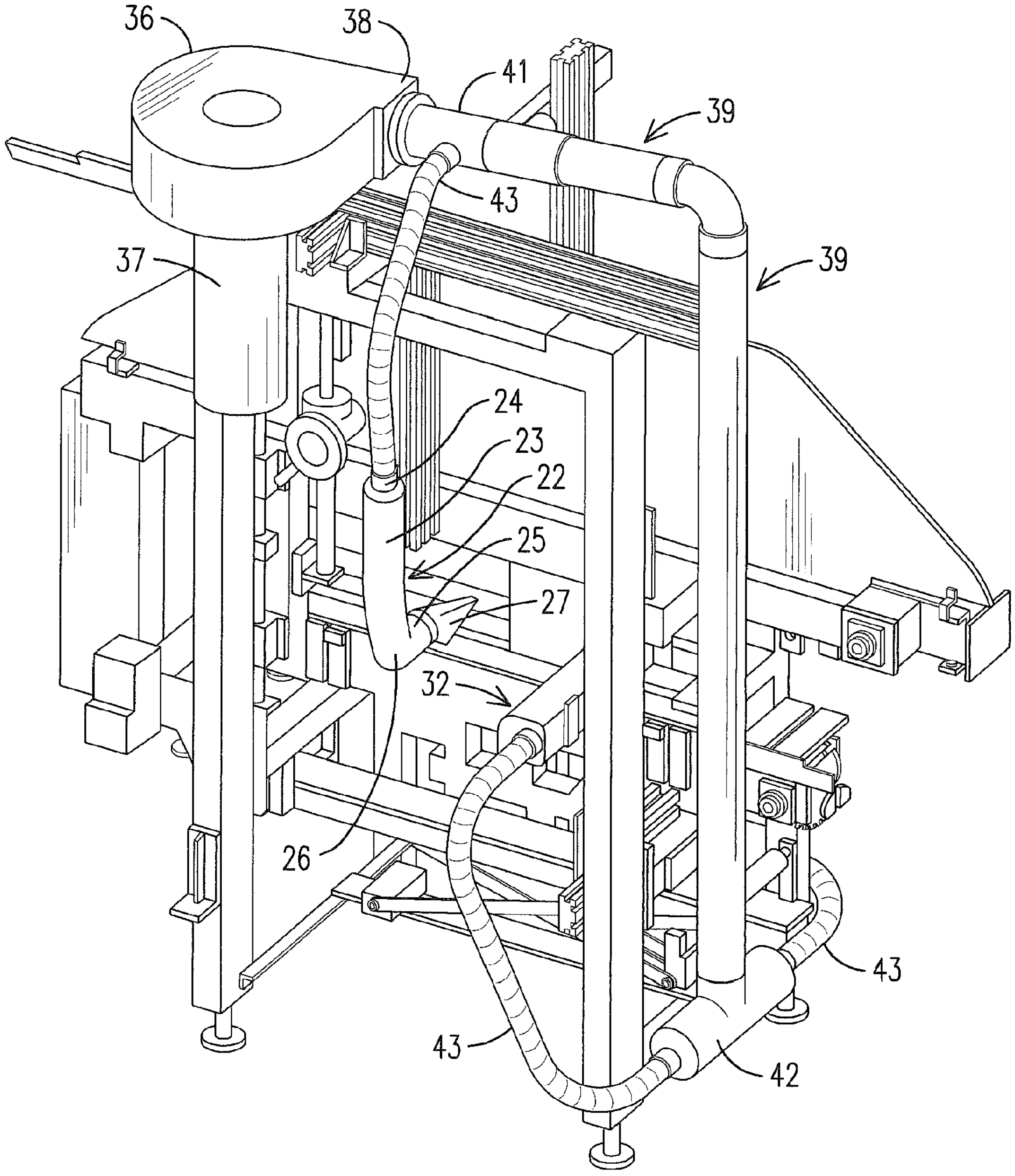
FIG. 2 is a perspective rear quarter view of the heat transfer labeling machine of FIG. 1.

Referring now in more detail to the drawing figures, wherein like reference numerals indicate like parts throughout the several views, FIGS. 1 and 2 illustrate one possible configuration of a heat transfer labeling machine that embodies principles of the invention. It will be understood that the particular configuration shown in these figures is not limiting or critical and that labeling machines of various different configurations might well benefit from the inventive concepts disclosed and discussed herein. It should further be understood that many components of the machine have been eliminated in FIGS. 1 and 2 for clarity and to illustrate the invention better.

Referring to FIG. 1, a heat transfer labeling machine 11 comprises a frame 12 that supports a container transport 13, which moves containers 15 such as plastic bottles in a downstream direction 14. The motion of the bottles carries them past an applicator head 16 of a web transport assembly 17, which pays out a web 18 containing heat transfer labels and moves the web through the applicator head 16. The applicator head may include a pre-heat plate and/or a preheated platen to soften the release layer between the web and the labels. The bottles and the web are synchronized such that, as each bottle passes the applicator head and is rotated, a heat transfer label from the web engages the bottle and is progressively transferred from the web and applied to the bottle by an application roller at the end of the applicator head 16. The web transport apparatus 17 then winds the empty web around a take-up reel (not shown). In this way, heat transfer labels can be applied to bottles at high rates of speed such as, for instance, 100 bottles per minute or more.

A post-treatment station is located downstream of the applicator head 16 and a pair of heater assemblies are located at the post treatment station for heating a flow of air and directing the heated air toward freshly labeled bottles on the container transport. The heater assemblies in this embodiment comprise a front heater assembly 21 (visible in FIG. 1) and a rear heater assembly 22 (visible in FIG. 2). Referring to FIG. 2, each heater assembly comprises an electric air heating unit 23 having an inlet 24 and an outlet 25. An air duct 26 is coupled to the outlet 25 and terminates in a nozzle or knife (knife nozzle) 27 that directs hot air in a narrow stream toward bottles moving along the container transport 13. Each air heating unit is coupled to a control system (not shown) having the capacity to vary selectively the current flowing through the internal heating elements of the heating unit and thereby to vary the temperature of the air expelled from the blade 27. As discussed below, the control system also is connected to and receives data from sensors that may measure, for example, the temperature of air issuing from the nozzle blades, the temperature of the bottles and their labels after passing the post-treatment station, or other parameters. The control system is programmed to vary the temperature of the hot air substantially in real time to insure that bottles and their labels are heated to a predetermined temperature, 140-150 degrees Fahrenheit for example, regardless of the processing speed of the machine. For instance, for higher processing speeds, the control system may raise the temperature of the hot air to heat bottles to the desired temperature in a shorter time. The temperature may be lowered for slower processing speeds where the bottles dwell longer at the post-treatment station. The temperature also may be varied to accommodate different types of bottles or other containers and different types of heat transfer labels.

The control system may comprise a programmable logic controller (PLC) receiving data from the temperature sensors, which is then processed through a proportional integral derivative (PID) algorithm or processing logic to control the amount of electricity provided to the heating elements. A PLC also may be programmed to adjust the volume and thus the velocity of the air stream to correspond to the rate bottles are being labeled, i.e. the processing speed of the machine. This may be done, for instance, by adjusting the speed of the blowers, with controllable baffles, or the like. Alternatively, the controller may comprise a computer that is programmed to receive data from the sensors and to control the heating elements and the blower to ensure that the labels reach the desired glossing temperature regardless of the processing speed of the machine, ambient conditions, or other factors.

The embodiment illustrated in FIGS. 1 and 2 also includes a pre-treatment station upstream of the applicator head 16 and a pair of air heating assemblies is similarly disposed at the pre-treatment station for directing heated air onto bottles before labels are applied. These heating assemblies comprise a front heating assembly 31 and a rear heating assembly 32 that are generally the same as the heating assembly 22 at the post-treatment station described in detail below. It should be noted that pre-treatment heating may not be required for bottles and labels embodying the aforementioned new chemistries and, in this event, the heating assemblies 31 and 32 at the pre-treatment station may be eliminated or simply not used during a labeling operation. Alternatively, the pretreatment nozzles may used to raise the temperature of bottles before labeling, thus reducing the amount of heat the post-treatment nozzles must add to the bottle to reach the desired wax glossing temperature. While perhaps not the most efficient method, this technique nevertheless may be used to fit the space available or for other purposes.

A blower 36 is disposed in a convenient location on the apparatus and is driven by an electric motor 37 to produce a flow of air that issues from an outlet 38 of the blower 36. Although not limiting, in the particular illustrated embodiment, the air flow enters a first distribution manifold 41 having a pair of outlets to which flexible air ducts 43 are attached. The flexible air ducts 43 are coupled at their opposite ends to the front heating assembly 21 and the rear heating assembly 22 (FIG. 2) at the post-treatment station to deliver a flow of post-treatment air to the heating assemblies. Ductwork 39 directs the remaining air flow from the blower to a second distribution manifold 42, which similarly delivers flows of air to the front and rear heating assemblies 31 and 32 at the pre-treatment station. It will thus be seen that the blower generates air flows that are heated by the heating units 23 of the heating assemblies and then directed by ducts 26 and nozzle blades 27 toward bottles moving along the bottle transport 16. The blower motor 37 also is coupled to the control system (not shown), which is capable of varying the speed of the motor and thus varying the volume and velocity of air flow generated by the blower in a programmed manner. Variation of the volume and velocity of air also may be accomplished in other ways.

Generally, in operation plastic bottles to be labeled are loaded in a known manner onto the container transport 37 with each bottle disposed between a lower support base and an upper nozzle, which pressurizes the bottle in preparation for the application of a heat transfer label. If pre-treatment is called for, then the controller may activate the pre-treatment heating units to heat a flow of air that is directed toward bottles as they move through the pre-treatment station. If pre-treatment is not called for, then the pre-treatment heating assemblies may not be operated or may be eliminated altogether. The bottles then pass the applicator head 16, where a corresponding heat transfer label is applied to each bottle from the web 18 as the bottle rotates and the web traverses the roller. After application of a label, the bottles move through the post-treatment station. Here, a stream of heated air is directed at each bottle and label as it passes. The bottles may advantageously be rotated as they pass the post-treatment station.

The knife nozzles of the post-treatment heater assemblies are positioned and oriented to transfer the maximum heat to each bottle and its label. For example, the knife nozzles may be angled with respect to the bottles for shorter bottles so that the entire air stream impinges on each bottle. For taller bottles, the knives may be less angled or oriented vertically as needed. In any event, the controller adjusts the heating elements within the air heaters and the volume and thus velocity of air generated by the blower to match the processing speed of the machine. More specifically, the temperature and velocity of the air stream blown onto the bottles is adjusted so that each bottle and its label is heated to a predetermined desired temperature during the short time that it passes through the hot air stream. In one embodiment, a desired bottle temperature is about 140-150 degrees Fahrenheit. At this temperature, the waxes and lacquers on the labels are at least partially melted to create a glossy finish on the surface of the label thus “glossing out” the labels. However, this particular temperature is not a limitation and any desired predetermined temperature may be selected depending upon the properties of the bottles and labels. The control system may adjust the heating elements and blowers continuously as a function temperature readings supplied by the sensors to accommodate differences in bottles or labels during a labeling operation.

In addition to heating and glossing out the labels, the hot air stream, which can have a temperature in the range of 1000 degrees Fahrenheit, functions to “burn out” flaws in the label or its application such as, for example, bubbles beneath the label. The burned out flaws are then much more detectable by a downstream vision system that can identify bottles with flawed labels or label application so that they may be removed from production. This is important since flaws detected by a bottle filler or bottling company in just a few bottles can result in rejection by the bottling company of an entire delivery of bottles from a labeler.

The system of this invention also preferably includes temperature sensors at strategic locations. For example, temperature sensors may be located within the hot air stream to measure the temperature of the air as it is directed toward bottles. A sensor for measuring the temperatures of the bottles as they leave the post-treatment station is also preferred and this sensor may be an infrared or laser-based sensor that senses temperature without physical contact with the bottles. The sensors are coupled to the control system to provide temperature data to the control system, preferably on a real time basis. The controller is programmed to adjust the heaters and the blower to provide an air stream of the necessary temperature, volume, and velocity to ensure that bottles are heated to the desired temperature regardless of ambient conditions or the processing speed of the machine. Such a “closed loop” control system results in substantially enhanced quality and consistency of the finished labeled bottles.

As with any heat treatment methodology in a labeling machine, immediate discontinuation of heat in the event of a machine jam or other stoppage must be provided for to prevent melting of stationary bottles or even fire. In flame-based treatment techniques, this is relatively easy since extinguishing the flame virtually immediately discontinues its heat. However, air flowing over the heating coils of an electric air heater is necessary to prevent the coils from burning out, which CaO necessitate an expensive repair. Accordingly, this invention includes an air diversion system for diverting hot air away from bottles in the event of a stoppage while maintaining a flow of air over the heating coils of the air heaters, at least until they cool down. While many configurations of such a diversion system might be possible, it is preferable that a fast acting dump valve be incorporated into the system. Activation of the dump valve simultaneously diverts the stream of hot air away from the bottles and to a benign dump location while diverting a stream of cool air through the knife nozzles to cool them and adjacent structures.

The invention has been described within the context of a particular embodiment having a particular configuration and employing a particular methodology. It will be understood, however, that the invention is not limited to the illustrated embodiment or methodology and that a wide range of additions, deletions, and modifications might be made by those of skill in the art without departing from the spirit and scope of the invention. For example, while a single front heater assembly and a single rear heater assembly has been illustrated at both the pre and post treatment stations, more or fewer might be used depending upon application specific requirements. It is envisioned, for example, that a post-treatment station might include four heater assemblies arranged, for instance, as two front and two rear assemblies. As mentioned, there also may be no heater assemblies at a pre-treatment station since some bottles and label chemistries do not require that the bottles be pre-treated. In addition, hoods and shrouding are envisioned for containing and managing the large amounts of very hot air that is generated by the heater assemblies. The blower has been shown in one particular location on the top of the frame. However, this is not necessary and the blower might be located in any convenient location. For example, the post-treatment station might be located along an elongated section of the container transport downstream of the applicator head and the blower and ductwork might be located beneath this section. Although a specific control methodology has been described for glossing out freshly applied labels, more broadly stated the invention comprises a method of glossing out freshly applied heat transfer labels using controlled hot air. The invention also comprises a method of enhancing detection of flaws in freshly applied labels by burning out flaws using controlled hot air and subjecting the labels to a vision system programmed to recognize the burned out flaws. These and many other modifications might well be made within the scope of the invention, which is limited only by the claims.

What is claimed is:

1. An apparatus for applying heat transfer labels to containers as the containers are conveyed in a generally downstream direction, the apparatus comprising:

a labeling station at which heat transfer labels are released from a web onto the surfaces of containers;

a post-treatment station downstream of the labeling station;

an air nozzle at the post-treatment station oriented toward containers moving past the post-treatment station;

a blower coupled to the hot air nozzle for supplying a stream of air to the air nozzle;

a heater disposed and configured to heat the stream of air before the air is delivered to the air nozzle and toward containers at the post-treatment station;

a sensor for measuring the temperatures of containers after the containers pass the post-treatment station; and a control system operatively coupled to the sensor for receiving temperature information therefrom, the control system adjusting at least one characteristic of the stream of air based upon the measured temperature so that the temperatures of containers are maintained within a predetermine range upon exposure to the heated stream of air.

2. The apparatus of claim 1 and wherein the at least one characteristic comprises the temperature of the stream of air.

3. The apparatus of claim 1 and wherein the at least one characteristic comprises the volume of the stream of air.

4. The apparatus of claim 1 and wherein the at least one characteristic comprises the velocity of the stream of air.

5. The apparatus of claim 1 and further comprising a pre-treatment station upstream of the labeling station, a nozzle, heater, and blower for directing a stream of heated air at containers as the container move past the pre-treatment station.

6. In an apparatus for applying heat transfer labels to containers as the containers move generally in a downstream direction, the apparatus having a labeling station where heat transfer labels are applied to containers, a post-treatment station downstream of the heat treatment station, and a mechanism for heating labeled containers as the containers pass the post-treatment station to gloss the labels; the improvement wherein the mechanism for heating labeled containers comprises a hot air blower configured and positioned to blow hot air onto labeled containers as the containers move past the post-treatment station to heat the containers and applied labels, a sensor for measuring the temperatures of containers heated at the post-treatment station, and a controller for adjusting at least one characteristic of the hot air based upon the measured temperatures in such a way that containers and their labels are heated to a temperature within a predetermined range when exposed to hot air at the post-treatment station.

7. The apparatus of claim 6 wherein the at least one characteristic is selected from the group consisting of temperature, volume, and velocity.

8. The apparatus of claim 7 and further comprising a nozzle knife for configuring the stream of hot air as the hot air is directed to the containers.

9. The apparatus of claim 8 and further comprising a pre-treatment station upstream of the labeling station and a system for directing heated air onto containers at the pre-treatment station to prepare the surfaces of the containers for receiving heat transfer labels at the labeling station.

* * * * *

UNITED STATES PATENT AND TRADEMARK OFFICE

CERTIFICATE OF CORRECTION

PATENT NO. : 8,986,475 B2
APPLICATION NO. : 13/161608
DATED : March 24, 2015
INVENTOR(S) : Bruce A. Ense et al.

It is certified that error appears in the above-identified patent and that said Letters Patent is hereby corrected as shown below:

In the Specification

Column 3,
Line 30 reads “are” and should read -- is --.

Column 4,
Line 24 reads “may used” and should read -- may be used --.

Column 5,
Line 25 reads “function temperature” and should read -- function of temperature --.
Line 64 reads “CaO” and should read -- can --.

Column 6,
Line 16 reads “has been” and should read -- have been --.

In the Claims

Column 7,
Claim 5, lines 9-10 read “at containers as the container” and should read -- at containers as the containers --.

Signed and Sealed this
Fourteenth Day of July, 2015

Michelle K. Lee
*Director of the United States Patent and Trademark Office*